US011070522B1

(12) United States Patent
Maharia

(10) Patent No.: US 11,070,522 B1
(45) Date of Patent: Jul. 20, 2021

(54) REMOVING ANOMALIES FROM SECURITY POLICIES OF A NETWORK SECURITY DEVICE

(71) Applicant: Juniper Networks, Inc., Sunnyvale, CA (US)

(72) Inventor: Rashmi Maharia, Sikar (IN)

(73) Assignee: Juniper Networks, Inc., Sunnyvale, CA (US)

( * ) Notice: Subject to any disclaimer, the term of this patent is extended or adjusted under 35 U.S.C. 154(b) by 210 days.

(21) Appl. No.: 16/356,802

(22) Filed: Mar. 18, 2019

(51) Int. Cl.
*H04L 29/06* (2006.01)
*H04L 12/24* (2006.01)

(52) U.S. Cl.
CPC ...... *H04L 63/0263* (2013.01); *H04L 41/0213* (2013.01); *H04L 63/1425* (2013.01); *H04L 63/20* (2013.01)

(58) Field of Classification Search
CPC ............. H04L 63/0263; H04L 41/0213; H04L 63/1425; H04L 63/20
See application file for complete search history.

(56) References Cited

U.S. PATENT DOCUMENTS

| 9,384,360 B2 | 7/2016 | Lim | |
| 9,479,479 B1 * | 10/2016 | Tulasi | ................. H04L 63/0263 |
| 10,181,047 B2 | 1/2019 | Lim | |

OTHER PUBLICATIONS

Abedin et al. (Detection and Resolution of Anomalies in Firewall Policy Rules in Data and Applications Security 2006, LNCS 4127, pp. 15-29, 2006) (Year: 2006).*
"Routing Policy and Packet Filtering Feature Guide for EX2300, EX3400, and EX4300 Switches" by Juniper Networks published in 2017, 234 pages. (Year: 2017).*
ENNS, "NETCONF Configuration Protocol," Network Working Group, RFC 4741, Dec. 2006, 96pp.
Harrington et al., "An Architecture for Describing Simple Network Management Protocol (SNMP) Management Frameworks," RFC 3411, Network Working Group, Dec. 2002, 58 pp.

* cited by examiner

*Primary Examiner* — Oleg Korsak
(74) *Attorney, Agent, or Firm* — Shumaker & Sieffert, P.A.

(57) ABSTRACT

The techniques described herein may optimize a set of ordered rules of a security device through the removal of one or more anomalies. For example, a security management system or other configuration management system or component may detect and remove one or more anomalies from a set (e.g., list) of one or more ordered rules to be enforced by the network security device, such as shadowing anomalies, redundancy anomalies, and/or correlation anomalies, among others, as described herein. Security management system may transform the set of ordered rules to replace at least a subset of the rules within one or more mutually exclusive rules. In some instances, the security management system may optimize the transformed rule set, for example, by using redundancy removal and/or join/merge policies.

20 Claims, 9 Drawing Sheets

REMOVING ANOMALIES FROM SECURITY POLICIES OF A NETWORK SECURITY DEVICE

TECHNICAL FIELD

The disclosure relates to computer networks, and, more particularly, to management and configuration techniques of network security devices.

BACKGROUND

A computer network is a collection of interconnected network devices that can exchange data and share resources. In a packet-based network, such as an Ethernet network, the network devices communicate data by dividing the data into variable-length blocks called packets, which are individually routed across the network from a source device to a destination device. The destination device extracts the data from the packets and assembles the data into its original form.

Data and technology of the computer network are vulnerable to increasing levels of cyberthreats. Common types of network attacks include Denial of Service (DOS) attacks, spoofing attacks, packet eavesdropping or interception, and the like. Security devices, such as firewalls, provide network security from the cyberthreats. Administrators may configure one or more security policies to mitigate and/or resolve cyberthreats and network attacks. Security devices maintain data for a particular policy, e.g., as an ordered set of one or more rules, that are each keyed to a unique identifier. For example, upon occurrence of a triggering event, such as the receipt of a network packet, the security device sequentially traverses the ordered set of rules to determine the first rule in the set that applies to the triggering event data. If the security device finds an applicable rule, the security device proceeds to execute the specified action, such as to block or allow the packet, among others.

SUMMARY

In general, this disclosure describes techniques for optimizing a network security device through the removal of one or more anomalies from security policies installed or to be installed within a network security device. For example, a security management system or other configuration management system or component may detect and remove one or more anomalies from a set (e.g., list) of one or more ordered rules to be enforced by the network security device, such as shadowing anomalies, redundancy anomalies, and/or correlation anomalies, among others, as described herein. The security management system may transform the set of ordered rules to replace at least a subset of the rules within one or more mutually exclusive rules. In some instances, the security management system may optimize the transformed rule set, for example, by using a redundancy removal policy that removes overlapping rules with the same actions. In some instances, the security management system may optimize the transformed rule set using join/merge policies that merge rules that are nearly equal and have non-conflicting actions. The security management system or other configuration component may, for example, operate external to or be integrated within the network security device.

The techniques described herein are integrated into a practical application that may provide one or more technical advantages. For example, by optimizing the ordered set of rules as described herein, the network security device removes or combines rules without affecting the behavior of packets flowing through the network, while reducing memory utilization as less rules are stored in the set of rules. This decreases search time when evaluating a packet to the set of rules, thereby improving the efficiency of the network security device.

In one example, a method includes determining, by a security management system, that one or more packets match a lower-priority rule and a higher-priority rule of a set of ordered rules of a network security device; and in response to determining that the one or more packets match the lower-priority rule and the higher-priority rule, converting, by the security management system, the lower-priority rule to a mutually exclusive rule such that the one or more packets that originally match the lower-priority rule and the higher-priority rule do not match the converted lower-priority rule.

In another example, a security management system includes one or more processors, wherein the one or more processors are configured to: determine that one or more packets match a lower-priority rule and a higher-priority rule of a set of ordered rules of a network security device; and in response to determining that the one or more packets match the lower-priority rule and the higher-priority rule, convert the lower-priority rule to a mutually exclusive rule such that the one or more packets that originally match the lower-priority rule and the higher-priority rule do not match the converted lower-priority rule.

In yet another example, a non-transitory computer-readable storage medium having stored thereon instructions that, when executed, cause one or more processors to: determine that one or more packets matches a lower-priority rule and a higher-priority rule of a set of ordered rules of a network security device; and in response to determining that the one or more packets match the lower-priority rule and the higher-priority rule, convert the lower-priority rule to a mutually exclusive rule such that the one or more packets that originally match the lower-priority rule and the higher-priority rule do not match the converted lower-priority rule.

The details of one or more examples of the techniques of the disclosure are set forth in the accompanying drawings and the description below. Other features, objects, and advantages of the techniques described herein will be apparent from the description and drawings, and from the claims.

DETAILED DESCRIPTION

Figure 1:
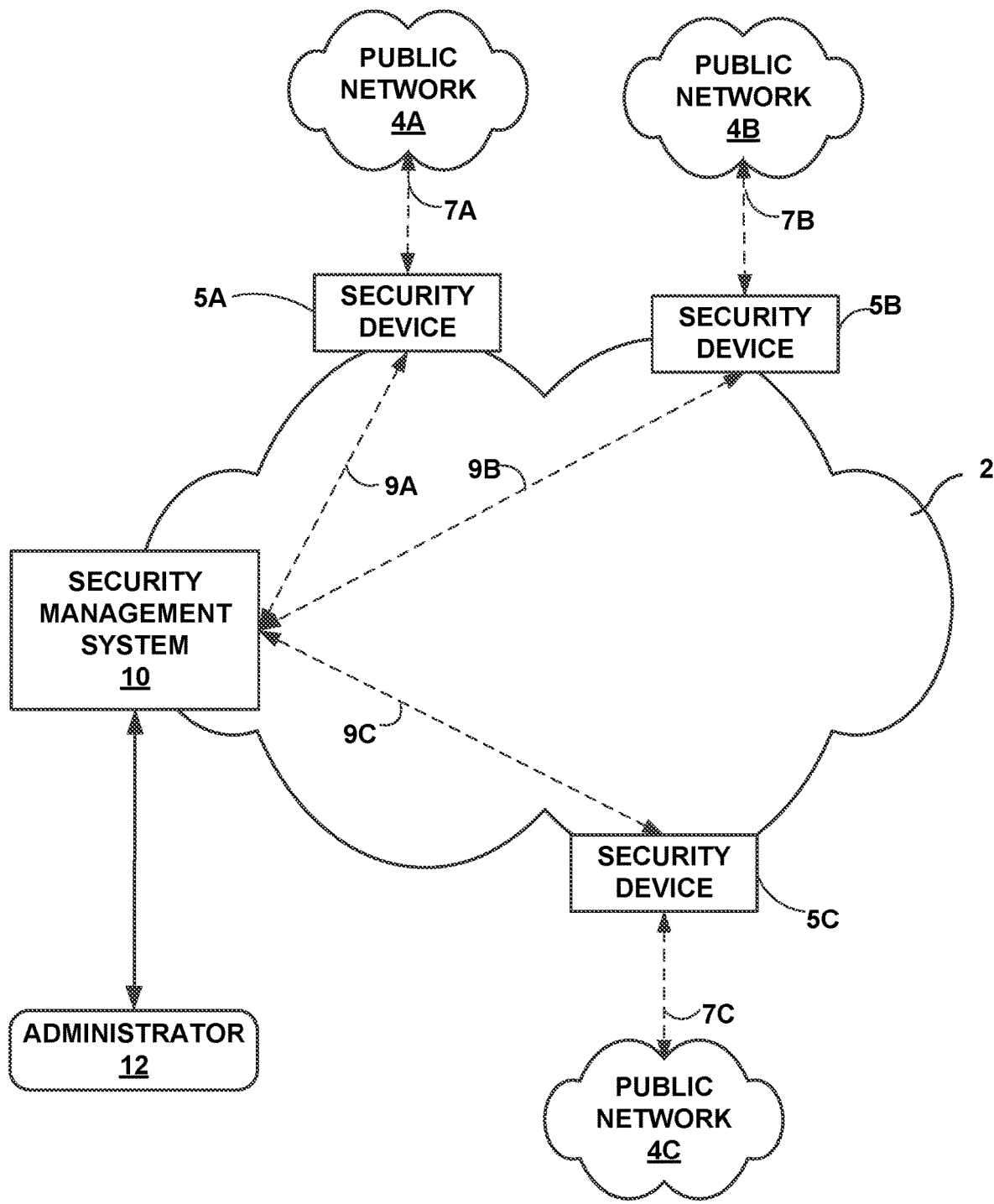
FIG. 1 is a block diagram illustrating an example enterprise network having a security management system configured to optimize a set of ordered rules of a network security device, in accordance with the techniques described herein.

FIG. 1 is a block diagram illustrating an example enterprise network having a security management system configured to optimize a set of ordered rules of a network security device, in accordance with the techniques described herein. In the example of FIG. 1, enterprise network 2 includes a security management system 10 and one or more network security devices 5 deployed in a distributed manner throughout the network.

The one or more network security devices 5A-5C (collectively "security devices 5") of enterprise network 2 are interconnected via communication links that form a communication topology. In general, security devices 5 monitor packet flows within network 2 and apply security services to those packet flows so as to protect computing resources (not shown) within the network, such as network servers, end user computers and infrastructure devices providing network connectively. For example, security devices 5 may perform deep packet inspection on the packet flows to detect patterns or anomalies within the packet flows that are indicative of threats, such as network attacks, viruses, malware and the like. During this process, security devices 5 typically apply polices that define criteria (e.g., header information, patterns, anomaly information) to be compared with the packet flows and take actions specified by the policies, such as dropping packet flows, logging packet flows or redirecting packet flows to packet analyzers for further analysis. Security devices 5 may include, for example, firewalls or other intrusion detection systems (IDS) or intrusion prevention systems (IDP), or even high-end routers or service nodes configured to apply network security services to packet flows within network 2.

Administrator 12 may use security management system 10 to configure security devices 5 with security policies, where each security policy represents a set of one or more ordered rules that specify certain operational characteristics that further the objectives of administrator 12. For example, administrator 12 may, using policies with a collection of an ordered set of rules, specify for a security device 5 a particular security policy regarding security of incoming or outgoing Internet Protocol (IP) traffic. The set of ordered rules may be implemented using an adjacency matrix, adjacency list, adjacency multilist, or the like.

In general, security devices 5 maintain data for a particular policy as an ordered set of one or more rules that are each keyed to a unique identifier, such as one or more 5-tuple values of a packet (e.g., source IP address, destination IP address, source port, destination port, protocol). Upon occurrence of a triggering event in one of the managed security devices 5, such as the receipt of a network packet, the security device 5 sequentially traverses the ordered set to determine the first rule in the set that applies to the triggering event data. As one example, when a packet is received, the security device compares the one or more 5-tuple values of the packet to a matching condition of a preceding rule (e.g., highest-priority rule), and if the packet does not match the highest-priority rule, the security device compares the packet with a subsequent rule (e.g., a lower-priority rule), and continues this process until the packet matches a rule in the ordered set of rules. If the security device finds an applicable rule, the security device executes the specified action, e.g., update a traffic log (e.g., count the match), redirect the packet for further analysis and inspection, block or allow the packet, and others.

While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP).

Communication links interconnecting security devices 5 may be physical links (e.g., optical, copper, and the like) or wireless. Enterprise network 2 may be coupled to one or more additional private or public networks, e.g., the Internet (not shown).

In the example of FIG. 1, enterprise network 2 is shown coupled to public network 4A-4C (collectively "public network 4") (e.g., the Internet) via communication links 7A-7C, respectively. Public network 4 may include, for example, one or more client computing devices. Public network 4 may provide access to web servers, application servers, public databases, media servers, end-user devices, and other types of network resource devices and content. Network devices in public network 4 may present a number of security threats to enterprise network 2. For example, devices in public network 4 may attempt to deliver worms, trojans, and/or viruses to the client computing devices. As another example, a hacker using a device in public network 4 may attempt to infiltrate enterprise network 2 to snoop, corrupt, destroy, or steal information stored by the client computing devices.

Because of the increasing sophistication of cyberthreats, administrators are tasked to configure and/or maintain one or more rules for security devices 5 to protect computer networks from the cyberthreats and network attacks. In some instances, an administrator may configure a set of ordered rules, configure one or more new rules that are added to an existing set of ordered rules, modify one or more existing rules of the set of ordered rules, and/or remove one or more rules from the set of ordered rules. The addition, modification, or removal of rules may affect the existing set of rules, for example, by causing one or more anomalies, such as shadowing anomalies, redundancy anomalies, and correlation anomalies, among others.

A shadowing anomaly occurs when a preceding rule (e.g., higher-priority rule), shadows a subsequent rule (e.g., lower-priority rule). As one example, a security device may include a set of ordered rules having a higher-priority rule, $R_1$, with a matching condition of source IP address of 100.0.0.0/24, and an action to drop the packet. The set of ordered rules may also include a subsequent rule, $R_2$, with a lower-priority having a matching condition of source IP address of 100.0.0.1 and a destination port of 80, and an action to police the packet, as shown below:

| Rule | Match | Action |
|------|-------|--------|
| $R_1$ | SIP = 100.0.0.0/24 | Drop |
| $R_2$ | SIP = 100.0.0.1, DP = 80 | Police |

In this example, if a packet matches the matching condition of $R_1$, $R_2$ will never be activated and the action for $R_2$ will not be invoked. As such, $R_2$ and other shadowing anomalies in the set of ordered rules waste computer resources (e.g., processing, memory, etc.).

A redundancy anomaly occurs when the matching condition of two or more rules are the same, and the action of these rules are the same or similar. As one example, a security device may include a set of ordered rules having a higher-priority rule, $R_1$, with a matching condition of source IP address of 100.0.0.1 and a destination port of 80, and an action to mirror the packet. The set of ordered rules may also include a subsequent rule, $R_2$, having a lower-priority with a matching condition of source IP address of 100.0.0.1 and a destination port of 80, and an action to mirror the packet and count the rule match, as shown below:

| Rule | Match | Action |
|---|---|---|
| $R_1$ | SIP = 100.0.0.1, DP = 80 | Mirror |
| $R_2$ | SIP = 100.0.0.1, DP = 80 | Mirror + Count |

In this example, $R_1$ and $R_2$ have the same matching conditions and similar actions, and are therefore redundant. Redundancy anomalies waste computer resources (e.g., processing, memory, etc.).

A correlation anomaly occurs when match conditions of rules have some intersection, such as some overlap of the matching condition and different actions. As one example, a security device may include a set of ordered rules having a higher-priority rule, $R_1 i$, with a matching condition of source IP address of 100.0.0.0/24, and an action to police the packet. The set of ordered rules may also include a subsequent rule, $R_2$, having a lower-priority with a matching condition of a differentiated services code point (DSCP) of assured forwarding with low drop probability (AF11) and a destination port of 80, and an action to send the packet to a particular egress-interface, as shown below:

| Rule | Match | Action |
|---|---|---|
| $R_1$ | SIP = 100.0.0.0/24 | Police |
| $R_2$ | DSCP = AF11, DP = 80 | Egress-interface-1 |

In this example, some of the packets that match $R_1$ also matches $R_2$, and some of the packets that match $R_2$ also matches $R_1$. With different actions, $R_1$ and $R_2$ in essence are divided into two or more smaller rules, thereby degrading performance of the security device.

A set of ordered rules may also include other anomalies, such as irrelevance anomaly and generalization anomaly. An irrelevance anomaly occurs when a rule is irrelevant for a given time interval, i.e., incoming and outgoing packets do not match the rule for a given time interval. A generalization anomaly occurs when a lower-priority rule is a generalization of a higher-priority rule (i.e., packets that match higher-priority rule also match lower-priority rule) and if the actions of the rules are different.

In accordance with the techniques described herein, security management system 10 may optimize a set of ordered rules to remove one or more anomalies by defining mutually exclusive rules. As further described below, a security management system 10 may access/receive a set of ordered rules of a security device, transform the set of ordered rules to replace at least a subset of the rules within one or more mutually exclusive rules, and, in some instances, optimize the transformed rule set using redundancy removal and/or join/merge policies.

Security management system 10 may define mutually exclusive rules such that a packet that matches a subsequent rule does not match any preceding rule. Assume for example that a set of rules of one of security devices 5 includes three ordered rules, e.g., $R_1$, $R_2$, and $R_3$, from highest-priority to lowest-priority, respectively. In this example, security management system 10 may determine whether the set of ordered rules are mutually exclusive such that if a packet matches a lower-priority rule, the packet does not match a higher-priority rule, such as shown below:

If p matches $R_1 \rightarrow p \epsilon R_1$
If p matches $R_2 \rightarrow p \epsilon R_2 - R_1$
If p matches $R_3 \rightarrow p \epsilon R_3 - R_2 - R_1$
If p matches $R_i \rightarrow p \epsilon R_i - R_{i-1} - R_{i-2} - \ldots - R_1$;
$\rightarrow R_i - (R_{i-1} \cup R_{i-2} \cup \ldots \cup R_1)$ If a packet matches a lower-priority rule and a higher-priority rule, security management system 10 determines that the rules are not mutually-exclusive and converts the lower-priority rule to a mutually exclusive rule such that the packet that originally matches the lower-priority rule and the higher-priority rule does not match the converted lower-priority rule. That is, packets now match the converted-lower priority rule without matching the higher-priority rule. For example, security management system 10 may determine that one or more packets match $R_2$ and $R_1$. Security management system 10 may convert the lower-priority rule $R_2$ (e.g., into $R_2'$) such that packets that originally matched $R_2$ and $R_1$ now match $R_2$ without matching $R_1$, as shown below:

$R_2' = R_2 - R_1$

Security management system 10 repeats the process and converts any lower-priority rule that overlaps with one or more higher-priority rules into a mutually exclusive rule such that packets now match the converted lower-priority rule without matching a higher-priority rule. In some examples, security management system 10 may use, for example, a set difference property to determine whether the set of packets match a lower-priority rule without matching the higher-priority rule, as shown below:

$A - B = \{x | x \epsilon A \hat{} x \in B\}$ where a first set of packets "A" that matches $R_2$ is not in a second set of packets "B" that match $R_1$.

In response to defining one or more mutually exclusive rules, security management system 10 may optimize the transformed set of ordered rules by eliminating rules that result in an empty match criteria, i.e., a rule that would never be hit. As one example, assume that a security device includes a set of ordered rules having a higher-priority rule, $R_1$, with a match condition of a packet is a fragment and an action to drop the packet; and a lower-priority rule, $R_2$, with a match condition of a source IP address of 100.0.0.0/24 and fragment-flag set to more fragment, and an action to count the rule match, as shown below:

| Rule | Match | Action |
|---|---|---|
| $R_1$ | is-fragment | Drop |
| $R_2$ | SIP = 100.0.0.0/24, fragment-flag = MF | Count |

In the above example, security management system 10 may determine that a packet that is a fragment would match $R_2$ and $R_1$. Security management system may convert $R_2$ into a mutually exclusive rule, $R_2'$ such that the match condition of $R_2$ would exclude the match condition of $R_1$. For example, to exclude the match condition of $R_1$, a packet would not be a fragment. Security management system 10 may convert $R_2$ to include this condition (e.g., "is-not-fragment") in the match condition for $R_2$. For example, security management system 10 converts $R_2$ (e.g., into $R_2'$) to further include a match condition of "is-not-fragment" to the match condition. In this way, the match condition of $R_2'$ would exclude the match condition of $R_1$. Security management system 10 may determine that a packet would never match $R_2'$ because $R_2'$ includes a contradictory match condition (e.g., "fragment-flag=MF" and "is-not-fragment"). As such, security management system 10 may remove $R_2'$ from the set of ordered rules.

Security management system 10 repeats the process and determines that if a packet matches a lower-priority rule and one or more higher-priority rules, security management system 10 converts the lower-priority rule into a mutually exclusive rule such that the match condition of the lower-priority rule excludes the match condition of the higher-priority rule.

After defining mutually exclusive rules, security management system 10 may in some instances further optimize the set of ordered rules by removing redundant rules. Rules are redundant if the rules are related (e.g., if the same packets match two or more rules). A match need not be a complete match, but can be any amount of overlap and/or intersection. Security management system 10 may determine whether rules are related using a directed graph and/or using a rule combination bitmap.

If the rules are unrelated (i.e., no overlap), the rules cannot be further optimized. For example:

If $R_1 \cap R_2 = \emptyset \rightarrow$ No relation, no change

If rules are related, security management system 10 may determine whether the higher-priority rule is a subset of the lower-priority rule (e.g., a lower-priority rule converted to a mutually exclusive rule), or whether the lower-priority rule is a subset of the higher-priority rule before optimizing the set of ordered rules, as further described below.

In one example, security management system 10 may remove the lower-priority rule ($R_2$) if packets that match the lower-priority rule is a subset of packets that match the higher-priority rule ($R_1$). For example:

$R_2 \subseteq R_1 \rightarrow$ remove $R_2$

As one example, assume for example that a security device includes a set of ordered rules having a higher-priority rule, $R_1$, with a match condition of a protocol of TCP, and an action to count the match; and a lower-priority rule, $R_2$, with a match condition of a destination IP address of DIP-1 and destination port of 80, and an action to count the match, as shown below:

| Rule | Match | Action |
| --- | --- | --- |
| $R_1$ | Protocol = TCP | Count |
| $R_2$ | DIP-1, DP = 80 | Count |

In this example, security management system 10 determines that packets that match $R_2$ are a subset of packets that match $R_1$. For example, packets with a protocol of TCP matches $R_1$. A subset of the packets that have a protocol of TCP may also include a destination IP address of DIP-1 and destination port of 80, which matches $R_2$. Since packets that match $R_2$ are a subset of packets that match $R_1$, security management system 10 may remove the lower-priority rule, e.g., $R_2$.

In an example where packets that match a higher-priority rule ($R_1$) are a subset of packets that match a lower-priority rule ($R_2$), security management system 10 may remove the higher-priority rule ($R_1$) only if the rules have the same action. For example:

$R_1 \subseteq R_2 \rightarrow$ Remove $R_1$ if same actions between $R_1$ and $R_2$, otherwise preserve rule order As one example, assume that a security device includes a set of ordered rules having a higher-priority rule, $R_1$, with a match condition of a source IP address of 100.0.0.0/24, a destination IP address of 200.0.0.1, and a destination port of 80, and an action to accept the packet; a lower-priority rule, $R_2$, with a match condition of a source IP address of 100.0.0.0/24, and an action to drop the packet; and a lowest-priority rule, $R_3$, with a match condition of a destination IP address of 200.0.0.0.1, and an action to accept the packet, as shown below:

| Rule | Match | Action |
| --- | --- | --- |
| $R_1$ | SIP = 100.0.0.0/24, DIP - 200.0.0.1, DP = 80 | Accept |
| $R_2$ | SIP = 100.0.0.0/24 | Drop |
| $R_3$ | DIP = 200.0.0.1 | Accept |

In this example, security management system 10 determines that packets that match $R_1$ are a subset of packets that match $R_2$. In this example, packets with a source IP address of 100.0.0.0/24 match $R_2$. A subset of the packets that have a source IP address of 100.0.0.0/24 may also include a destination IP address of 200.0.0.1 and destination port of 80, which matches $R_1$. Since packets that match $R_1$ are a subset of packets that match $R_2$, security management system 10 may remove the higher-priority rule, e.g., $R_1$ only if the actions of the rules are the same. In this example, security management system 10 preserves the set of ordered rules because the actions of $R_1$ and $R_2$ are different.

Alternatively, assume for example that the actions are the same. For example, a security device includes a set of ordered rules having a higher-priority rule, $R_1$, with a match condition of a source IP address of 100.0.0.0/24, a destination IP address of 200.0.0.1, and a destination port of 80, and an action to accept the packet; a lower-priority rule, $R_2$, with a match condition of a source IP address of 100.0.0.0/24, and an action to accept the packet; and a lowest-priority rule, $R_3$, with a match condition of a destination IP address of 200.0.0.0.1, and an action to accept the packet, as shown below:

| Rule | Match | Action |
| --- | --- | --- |
| $R_1$ | SIP = 100.0.0.0/24, DIP - 200.0.0.1, DP = 80 | Accept |
| $R_2$ | SIP = 100.0.0.0/24 | Accept |
| $R_3$ | DIP = 200.0.0.1 | Accept |

In this example, security management system 10 determines that packets that match $R_1$ are a subset of packets that match $R_2$, and determines whether the rules are the same. In this example, security management system 10 removes $R_1$ because packets that match $R_1$ are a subset of packets that match $R_2$ and the actions of $R_1$ and $R_2$ are the same.

Security management system 10 may also, in response to defining mutually exclusive rules, further optimize the set of ordered rules by joining/merging a higher-ordered rule, $R_1$, and a lower-ordered rule, $R_2$ (e.g., a lower-ordered rule converted to a mutually exclusive rule) that are nearly equal. For example, if all but one match parameter are equal in the rules, the rules are nearly equal. Security management system 10 may merge the nearly equal rules if the actions are not conflicting. For example:

$R_1 \cup R_2 = R_1$ union $R_2$=match in $R_1$ or $R_2$ and actions are not conflicting An administrator, e.g., administrator 12, may define which actions are conflicting and non-conflicting. For example, administrator 12 may define accept, count, log, mirror as non-conflicting actions, and define accept and drop as conflicting actions.

As one example, assume that a security device includes a set of ordered rules having a higher-priority rule, $R_1$, with a match condition of a source IP address of 100.0.0.0/24, and an action to accept the packet; a lower-priority rule, $R_2$, with a match condition of a source IP address of 100.0.1.0/24, and an action to count the match, as shown below:

| Rule | Match | Action |
| --- | --- | --- |
| $R_1$ | SIP = 100.0.0.0/24 | Accept |
| $R_2$ | SIP = 100.0.1.0/24 | Count |
| $R_1 \cup R_2$ | SIP = 100.0.0.0/23 | Accept, Count |

In this example, security management system 10 determines that all but one match parameter (e.g., source IP address) are equal in both $R_1$ and $R_2$. For example, all packets that match $R_2$ match $R_1$ except for a packet having a source IP address of 100.0.1.0/24. Since $R_1$ and $R_2$ are nearly equal, security management system 10 determines whether the actions of $R_1$ and $R_2$ non-conflicting. In this example, security management system 10 may merge $R_1$ and $R_2$ (as illustrated above as the third row) because accept and count are non-conflicting. Alternatively, if the actions were conflicting (e.g., accept and drop), security management system 10 would preserve the set of ordered rules.

The techniques described herein are integrated into a practical application that may provide one or more technical advantages. For example, by optimizing the ordered set of rules as described herein, the security device removes or combines rules without affecting the behavior of packets flowing through the network, while reducing memory utilization as less rules are stored in the set of rules. This decreases search time when evaluating a packet to the set of rules, thereby improving the efficiency of the security device.

Figure 2:
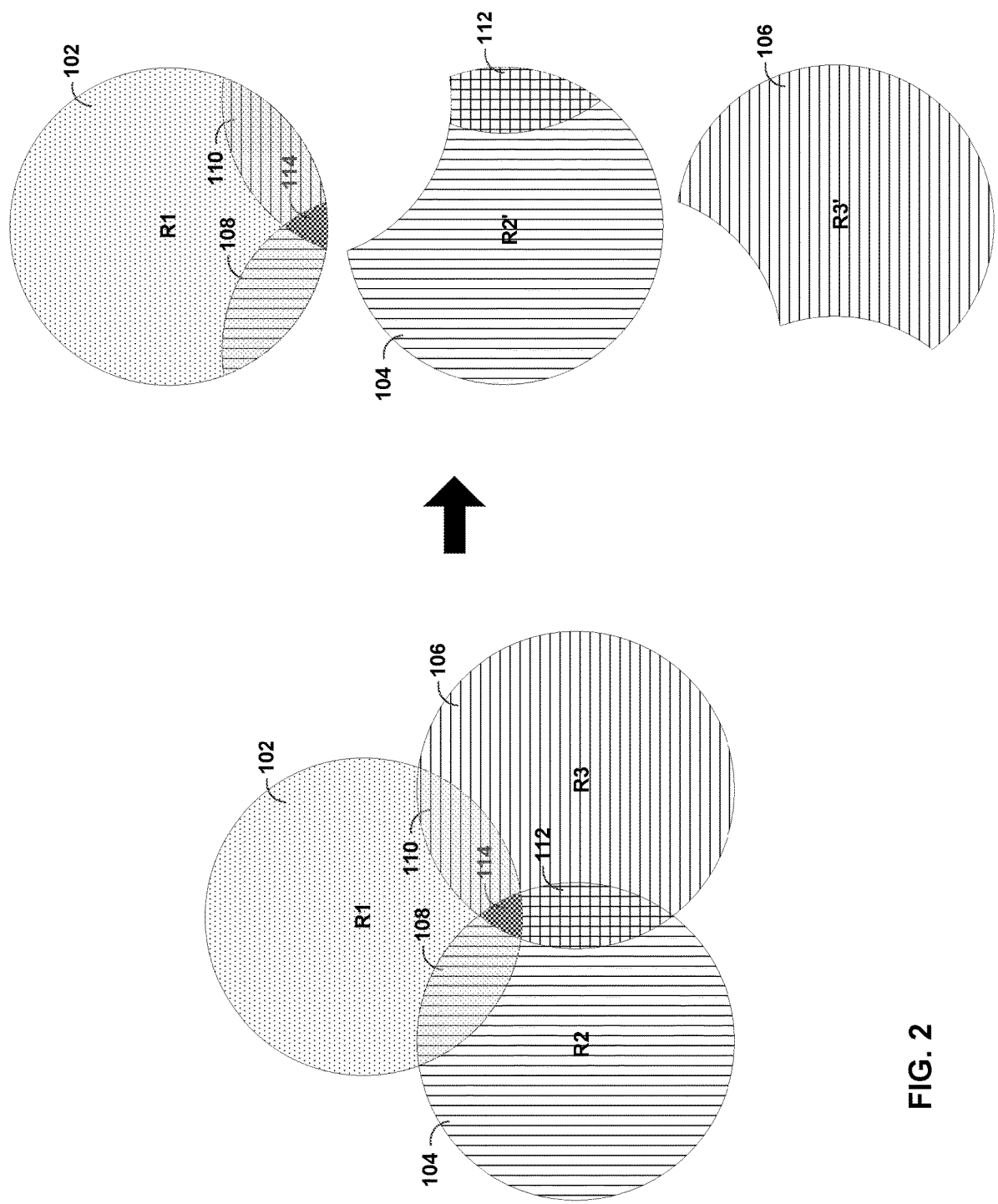
FIG. 2 is a conceptual diagram illustrating an example processes described herein for automatically processing an initial rule set and generating mutually exclusive replacement rules, in accordance with the techniques described herein.

FIG. 2 is a conceptual diagram illustrating an example processes described herein for automatically processing an initial rule set and generating mutually exclusive replacement rules, in accordance with the techniques described herein. In the example of FIG. 2, a set of ordered rules may include three rules, e.g., R1, R2, and R3, from highest-priority rule to lowest-priority rule, respectively. In the example of FIG. 2, a first set of packets 102 ("first set 102") may match only R1, a second set of packets 104 ("second set 104") may match only R2, a third set of packets 106 ("third set 106") may match only R3, a fourth set of packets ("fourth set 108") may match both R1 and R2, a fifth set of packets 110 ("fifth set 110") may match both R1 and R3, a sixth set of packets 112 ("sixth set 112") may match R2 and R3, and a seventh set of packets 114 ("seventh set 114") may match R1, R2, and R3.

In this example, a security management system, e.g., security management system 10 of FIG. 1, may determine whether packets that match a lower-priority rule overlaps with packets that match a higher-priority rule. In the example of FIG. 2, security management system 10 determines that the fourth set 108 and the seventh set 114 matches R2 and R1. Security management device 10 may convert R2 such that the fourth set 108 and seventh set 114 no longer match R2. For example, security management system 10 may convert R2 (illustrated as R2') such that only the second set 104 and the sixth set 112 match R2'. That is, the second set 104 and the sixth set 112 matches R2' without matching R1.

Security management system 10 may also determine that the sixth set 112 matches R3 and R2, and that the fifth set 110 and seventh set 114 matches R3 and R1. Security management system 10 may convert R3 such that the fifth set 110, sixth set 112, and seventh set 114 no longer match R3. For example, security management system 10 may convert R3 (illustrated as R3') such that only the third set 106 matches R3'. That is, the third set 106 matches R3' without matching R2' and R1. FIG. 2 is merely an example, and may include any number of rules for which security management system 10 may define mutually exclusive rules.

Figure 3:
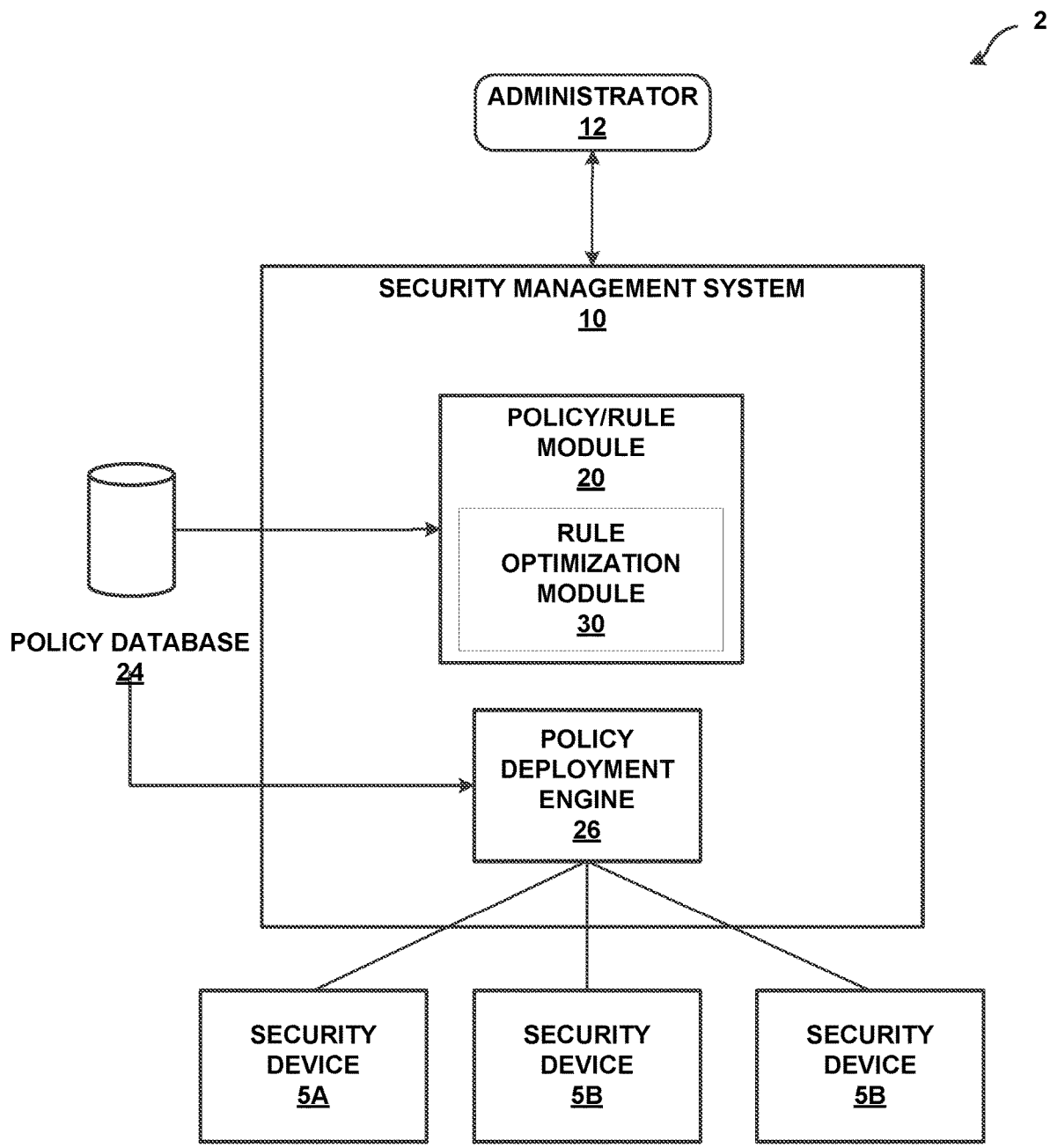
FIG. 3 is a block diagram illustrating an example security management system, in accordance with the techniques described herein.

FIG. 3 is a block diagram illustrating an example security management system, in accordance with the techniques described herein. As described herein, security management system 10 provides a system to optimize a set of ordered rules of a network security device, e.g., security devices 5. Security management system 10 or other configuration component may, for example, operate external to or be integrated within the network security device, e.g., security device 5.

In the example of FIG. 3, for example, security management system 10 may include a policy/rule module 20 that executes on one or more processors of security management system 10, wherein the policy/rule module 20 may generate configuration information for security devices 5 based on configuration information automatically generated by security management system 10 or defined by administrator 12. In response to policy/rule module 20 creating or modifying security policies, security management system 10 may store configuration parameters in a policy database 24. Security management system 10 may also include a policy deployment engine 26 that sends the configuration information of security policies to security devices 5.

In general, the underlying policy deployment engine 26 of security management system 10 may use one or more network management protocols designed for management of configuration information data within managed security devices 5, such as the Simple Network Management Protocol (SNMP) protocol or the Network Configuration Protocol (NETCONF) protocol or a derivative thereof, such as the Juniper Device Management Interface, to manage the security policies within security devices 5. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference. NETCONF is described in R. Enns et al., RFC 4741: "NETCONF Configuration Protocol," Network Working Group, the Internet Engineering Task Force draft, December 2006, available at http://tools.ietf.org/html/rfc4741, which is incorporated herein by reference in its entirety. Using the network management protocol, security management system 10 may establish configuration sessions with one or more security devices 5 that allow security management system 10 to traverse and modify configuration information data within the identified security devices 5.

In accordance with the techniques described herein, policy/rule module 20 may include a rule optimization module 30. Rule optimization module 30 may detect and remove shadowing anomalies, redundant anomalies, and correlation anomalies from a set of ordered rules of one or more of security devices 5. For example, administrator 12 may invoke the rule optimization module 30 prior to and/or following the configuration of a new rule or modification of an existing rule.

Rule optimization module 30 may access and/or receive the set of ordered rules from security devices 5 and optimize the set of ordered rules. For example, rule optimization module 30 may use, e.g., SNMP or NETCONF, to access and optimize the set of ordered rules in one or more of security devices 5. Rule optimization module 30 may perform the techniques described above, such as transforming a set or ordered rules to replace at least a subset of the rules with one or more mutually exclusive rules. Rule optimization module 30 may also optimize the transformed rule set by removing redundant rules and/or merge nearly equal rules, as described above.

Elements of security management system 10 may be implemented solely in software, or hardware, or may be implemented as combinations of software, hardware, or firmware. For example, security management system 10 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of security management system 10 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of security management system 10, e.g., protocols, processes, and modules/units. Security management system 10, in some examples, retrieves and executes the instructions from memory for these aspects.

Figure 4:
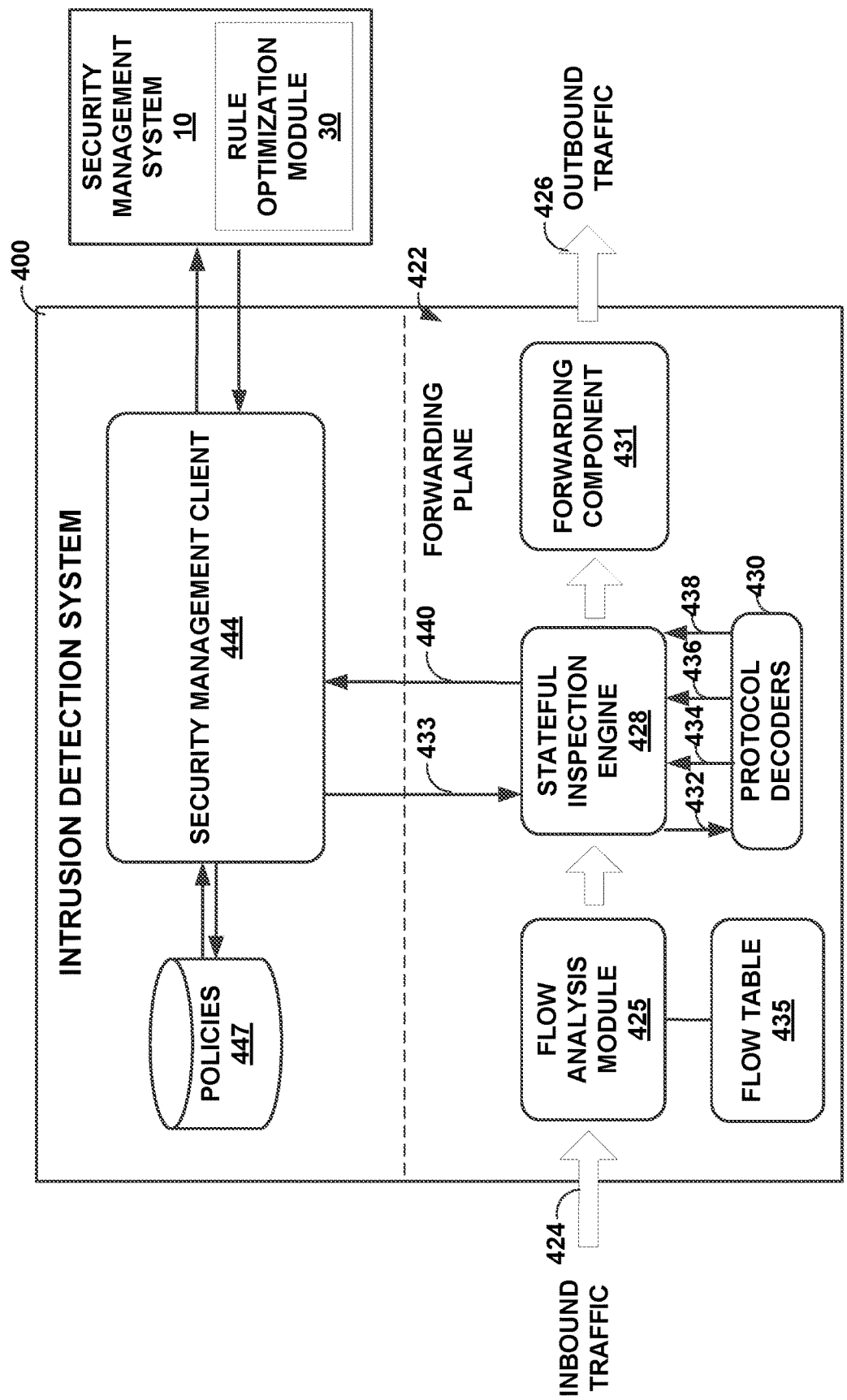
FIG. 4 is an example network security device, which processes network flows to identify potential network threats, in one aspect of this disclosure.

FIG. 4 is an example intrusion prevention system (IDS) 400, which represents an example implementation of any of network security devices 5 of FIG. 1. As described below, IDS 400 processes network inbound and outbound packet flows entering and egressing network 2 and performs deep packet inspection on packet flows to identify potential network threats. Moreover, as further described below, IDS 400 receives optimization instructions from security management system 10 and applies the optimization instructions to a set of ordered rules of IDS 400.

In the illustrated example, IDS 400 includes a forwarding plane 422 that transparently monitors inbound network traffic 424 and forwards the network traffic as outbound network traffic 426. In the example illustrated by FIG. 4, forwarding plane 422 includes flow analysis module 425, stateful inspection engine 428, protocol decoders 430, and forwarding component 431.

Security management client 444 provides a configuration interface for communicating with security management system 10 in accordance with one or more device configuration protocols. For example, security management system 10 may output communications to security management client 444 to control and configure IDS 400 to apply security policy rules received from security management system 10.

As another example, security management system 10 may provide and install policies 447 that specify attack definitions 433, which, in some example approaches, security management client 444 relays to stateful inspection engine 428. In one example, attack definitions 433 may be compound attack definitions. Moreover, security management system 10 may present a user interface by which administrator 12 may modify assumptions regarding packet flow characteristics, such as the highest priority packet flows for monitoring, port bindings for applications, or other features of determining a type of application and protocol associated with the packet flow. Security management client 444 may receive the aforementioned information for storage within policies 447 and relays the information to the stateful inspection engine 428 for real-time application to packet flows.

Flow analysis module 425 receives inbound traffic 424 and identifies individual network flows within the traffic. Each network flow represents a flow of packets in one direction within the network traffic and is identified by at least a source address, a destination address and a communication protocol. Flow analysis module 425 may utilize additional information to specify network flows, including source media access control ("MAC") address, destination MAC address, source port, destination port, and protocol. Other examples may use other information to identify network flows, such as IP addresses, application sessions, and bandwidth usage.

Flow analysis module 425 maintains flow data within flow table 435 that describes each active packet flow present within the network traffic. Flow table 435 specifies network elements associated with each active packet flow, i.e., low-level information such as source and destination devices and ports associated with the packet flow. In addition, flow table 435 may identify pairs of packet flows that collectively form a single communication session between a client and server. For example, flow table 435 may designate communication session as pairs of packet flows in opposite directions for flows sharing at least some common network addresses, ports and protocol.

Stateful inspection engine 428 inspects both client-to-server packet flows as well as server-to-client packet flows in order to more accurately identify the type of application and underlying protocol for each communication session. This may assist when, for example, a malicious user attempts to spoof (i.e., mimic) one type of application and instead use another in attempt to bypass an IDS. As an example, a malicious user may attempt to circumvent an IDS by spoofing an SMTP request when actually using the HTTP protocol. IDS 400 may determine from the response from the server that the original packet flow was just an attempt to bypass IDS 400 and may take appropriate action, such as dropping future packets associated with the packet flow and/or alerting the targeted device of the attack.

In some example approaches, IDS 400 may use a minimum data size of the reassembled TCP segments, in addition to the signature, in order to identify the types of applications. Certain applications may require a minimum amount of data, so IDS 400 may distinguish malicious packet flows by determining whether the packet flow contains enough data for the identified protocol. Moreover, IDS 400 may not necessarily recognize every application. In one example, when an application is unknown, IDS 200 may simply forward the packet flow. If IDS 400 cannot identify a given application, it may be because that application is not a typical target for a malicious packet flow. Other examples may take other actions for unidentified applications, however, such as discarding all packets, which target unknown applications or applying a default signature to all packet flows associated with unknown application types. Other examples may also utilize other protocols, such as the user datagram protocol (UDP); IDS 400 accordingly may require a minimum data size of UDP segments in order to identify the application associated with the UDP segments.

For each packet flow, stateful inspection engine 428 buffers a copy of the packet flow and reassembles the buffered packet flow to form application-layer communications 432. For example, stateful inspection engine 428 may reconstruct TCP segments into application-layer communications 432, which represent protocol-specific messages.

Stateful inspection engine 428 invokes the appropriate one of protocol decoders 230 based on the identified type of application determination to analyze the application-layer communications 432. Protocol decoders 430 represent a set of one or more protocol-specific software modules. Each of protocol decoders 430 corresponds to a different communication protocol or service. Examples of communication protocols that may be supported by protocol decoders 430 include the HyperText Transfer Protocol ("HTTP"), the File Transfer Protocol ("FTP"), the Network News Transfer Protocol ("NNTP"), the Simple Mail Transfer Protocol ("SMTP"), Telnet, Domain Name System ("DNS"), Gopher, Finger, the Post Office Protocol ("POP"), the Secure Socket Layer ("SSL") protocol, the Lightweight Directory Access Protocol ("LDAP"), Secure Shell ("SSH"), Server Message Block ("SMB") and other protocols.

Protocol decoders 430 analyze reassembled application-layer communications 432 and output transaction data 434 that identifies application-layer transactions. In particular, transaction data 434 indicate when a series of related application-layer communications between two peer devices starts and ends.

Stateful inspection engine 428 receives transaction data 434, application-layer elements 436 and protocol anomaly data 438 from protocol decoders 430. Stateful inspection engine 428 applies policies 447 (e.g., attack definitions 433 or other rules) to protocol-specific application-layer elements 436 and anomaly data 438 to detect and prevent network attacks and other security risks.

In accordance with the techniques described herein, rule optimization module 30 of security management system 10 may access or receive the set of ordered rules in policies 447 of IDS 400 and optimize the set of ordered rules by removing one or more anomalies using the techniques as described herein. For example, administrator 12 may invoke the rule optimization module 30 prior to and/or following the configuration of a new rule or modification of an existing rule. Rule optimization module 30 may perform the techniques described above, such as transforming a set or ordered rules to replace at least a subset of the rules with one or more mutually exclusive rules. Rule optimization module 30 may also optimize the transformed rule set by removing redundant rules and/or merge nearly equal rules, as described above.

In response to optimizing the set of ordered rules of policies 447, security management client 444 relays the information to the stateful inspection engine 428 for real-time application to packet flows. Stateful inspection engine 428 applies the optimized policies 447 (e.g., attack definitions 433 or other rules) to protocol-specific application-layer elements 436 and anomaly data 438 to detect and prevent network attacks and other security risks.

Although rule optimization module 30 is illustrated as included in security management system 10, rule optimization module 30 may similarly be included in IDS 400 such that an administrator may invoke rule optimization module 30 to optimize the set of ordered rules in policies 447.

Figure 5A:
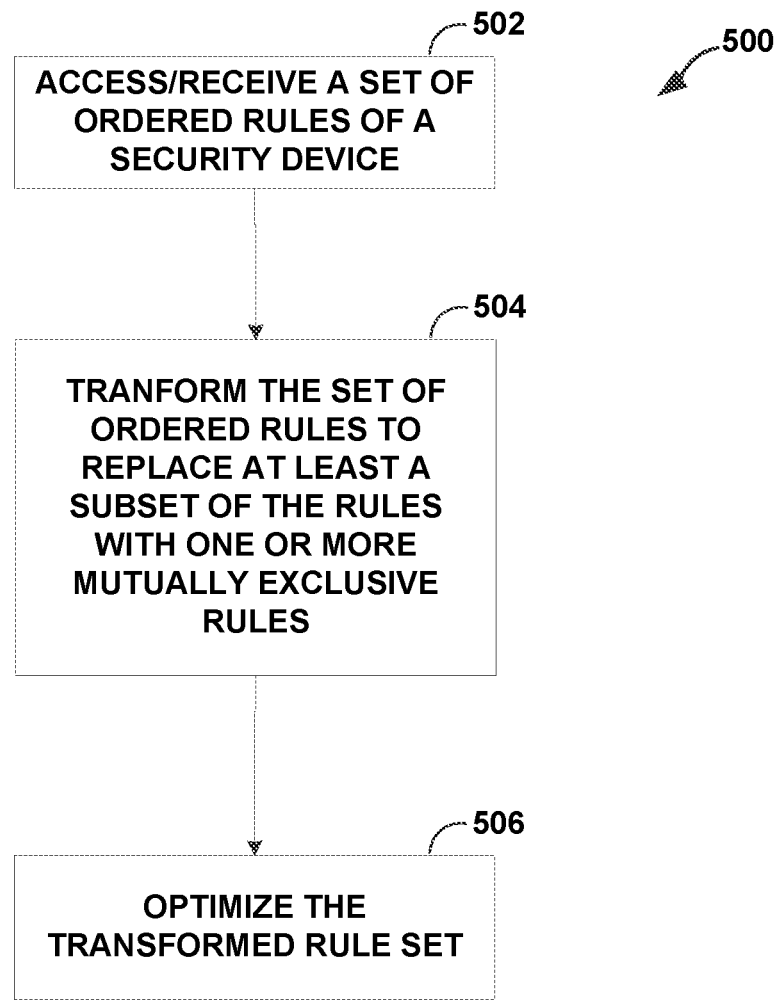
FIGS. 5A-5D are flowcharts showing example operations of a security management system configured to optimize a set of ordered rules of a network security device, in accordance with the techniques described herein.

FIGS. 5A-5D are flowcharts showing example operations of a security management system configured to optimize a set of ordered rules of a network security device, in accordance with the techniques described herein. FIGS. 5A-5D are described with respect to security management system 10 of FIGS. 1 and 3, but may similarly be performed by a security device. In the example of FIG. 5A, security management system 10 may perform operation 500 to define mutually exclusive rules. In the example operation 500, security management system 10 may access or receive a set of ordered rules of a security device (502). For example, security management system 10 may use SNMP or NETCONF to receive a set of ordered rules from a security device or to access the set of ordered rules within the security device.

Security management system 10 may optimize the set of ordered rules. For example, security management system 10 may transform the set of ordered rules to replace at least a subset of the rules within one or more mutually exclusive rules (504). As further described in FIG. 5B, security management system 10 may define mutually exclusive rules such that packets that originally matched a lower-priority rule and a higher-priority rule do not match the converted lower-priority rule. Security management system 10 repeats the process and converts any lower-priority rule into a mutually exclusive rule such that a packet matches the converted lower-priority rule without matching any of the higher-priority rules.

In some instances, security management system 10 may optimize the transformed rule set (506). As one example, security management system 10 may remove a lower-ordered rule (e.g., a lower-ordered rule converted to a mutually exclusive rule) if the lower-ordered rule will never be matched (e.g., if the match condition of the converted rule includes a contradictory condition). As further described in FIG. 5C, security management system 10 may alternatively, or additionally, optimize the transformed rule set using a redundancy removal policy that removes overlapping rules (i.e., packet set that matches a first rule is a subset of a packet set that matches a second rule) with the same actions. As further described in FIG. 5D, security management system 10 may alternatively, or additionally, optimize the transformed rule set using a join/merge policy that merge rules that are nearly equal and have non-conflicting actions.

Figure 5B:
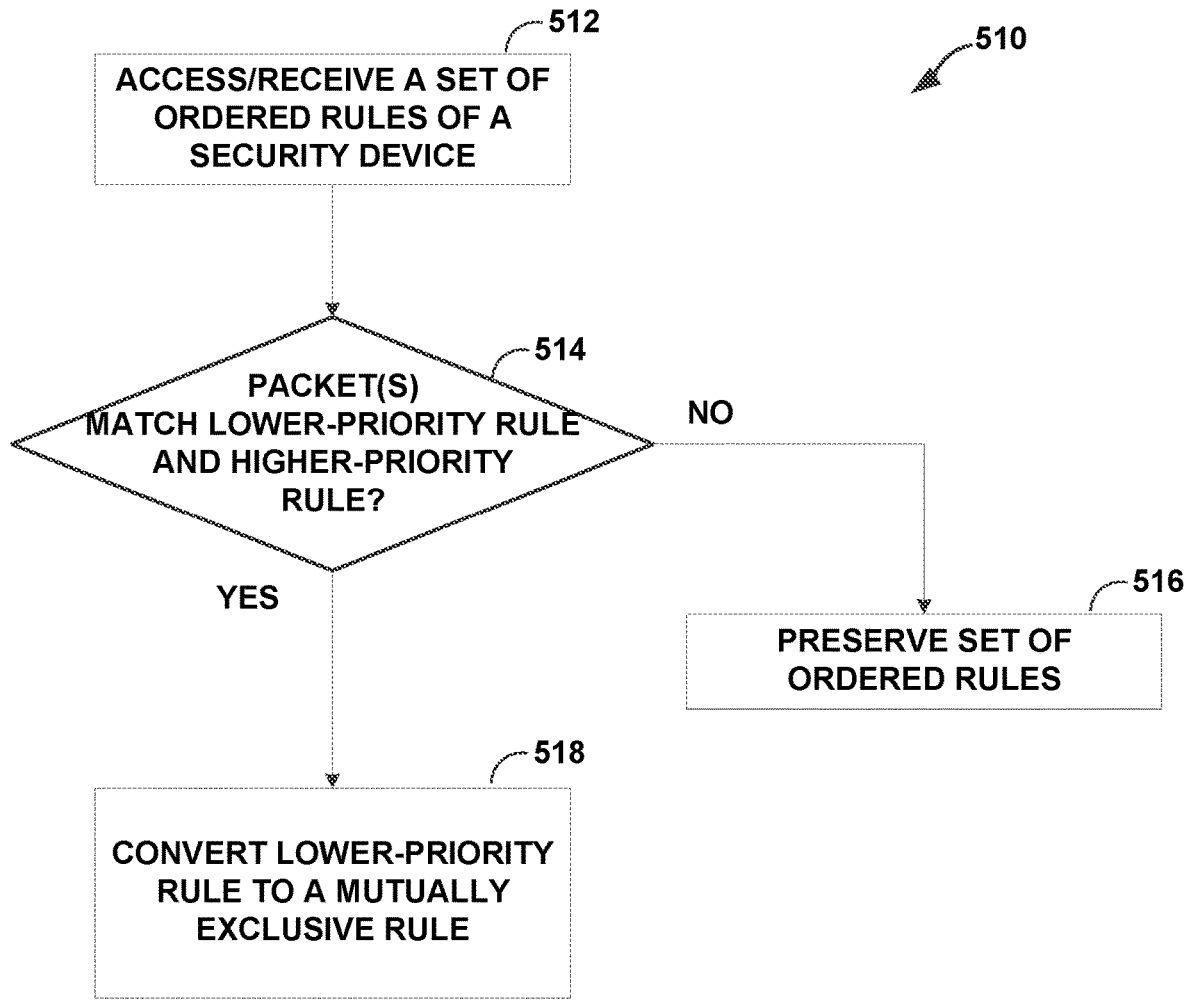

FIG. 5B is a flowchart showing an example of transforming the set of ordered rules to replace at least a subset of the rules with one or more mutually exclusive rules in greater detail. In the example of FIG. 5B, security management system 10 may perform operation 500 to define mutually exclusive rules. In the example operation 510, security management system 10 may access or receive a set of ordered rules of a security device (512). For example, security management system 10 may use SNMP or NETCONF to receive a set of ordered rules from a security device or to access the set of ordered rules within the security device.

Security management system 10 may determine whether one or more packets match a lower-priority rule and a higher-priority rule of a set of ordered rules of a network security device (514). If one or more packets do not match both the lower-priority rule and the higher-priority rule ("NO" branch of step 514), security management system 10 preserves the set of ordered rules (516). If one or more packets match both the lower-priority rule and the higher-priority rule ("YES" branch of step 514), security management system 10 converts the lower-priority rule to a mutually exclusive rule (518). For example, security management system 10 may convert the lower-priority rule such that the one or more packets that originally match the lower-priority rule and the higher-priority rule do not match the converted-lower priority rule. In some examples, security management system 10 may use a set difference property to determine whether packet sets that match the rules are mutually exclusive.

Figure 5C:
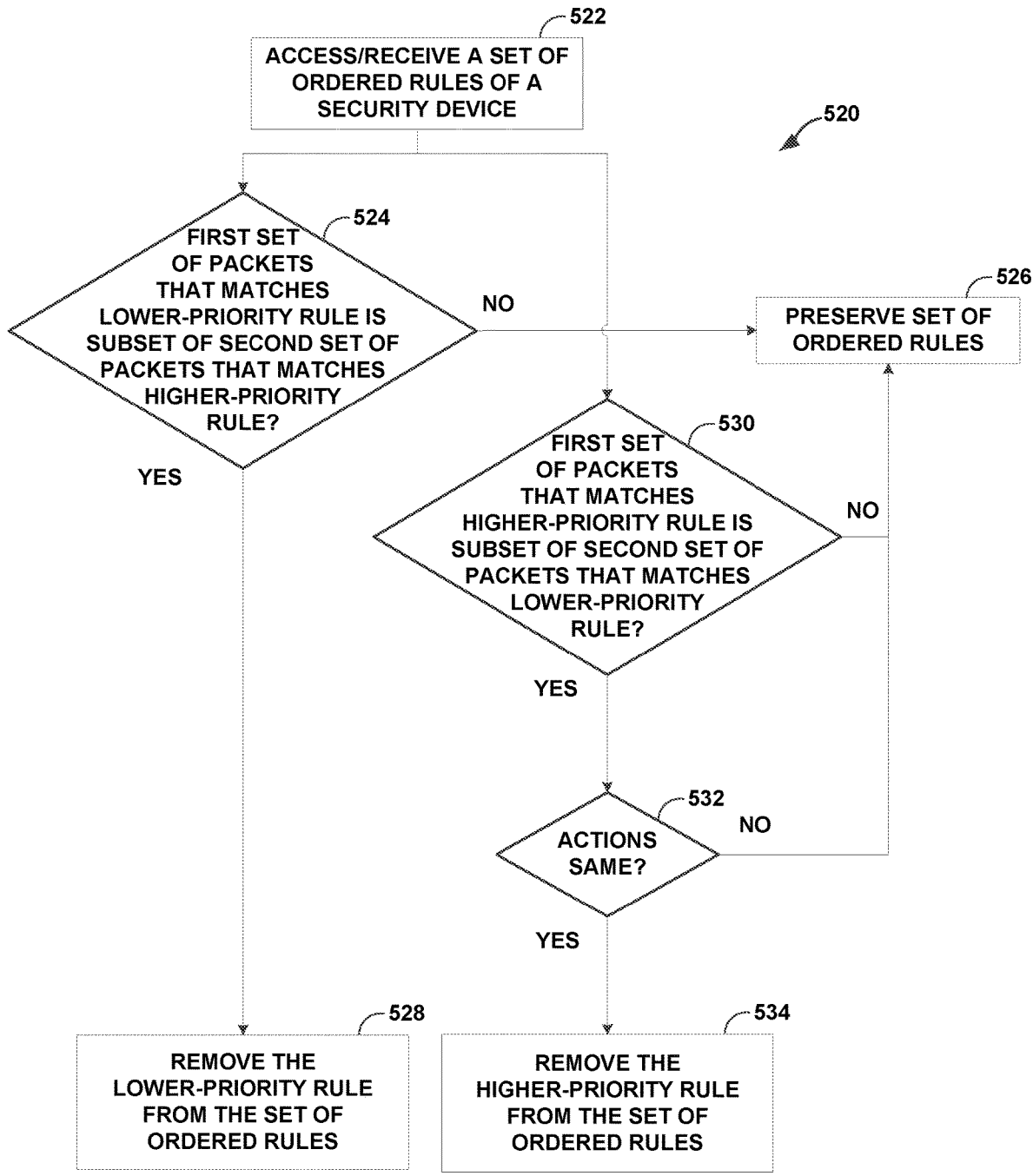

FIG. 5C is a flowchart showing an example of optimizing the transformed rule set using redundancy removal in greater detail. In the example of FIG. 5C, security management system 10 may perform operation 520 to remove redundancy anomalies. In the example operation 520, security management system 10 may access or receive a set of ordered rules of a security device (522). For example, security management system 10 may use SNMP or NETCONF to receive a set of ordered rules from a security device or to access the set of ordered rules within the security device.

In one instance, security management system 10 may determine whether a first set of packets that matches a lower-priority rule (e.g., the converted lower-priority rule) is a subset of a second set of packets that matches a higher-priority rule (524). If security management system 10 determines that the first set of packets that matches the lower-priority rule is a subset of the second set of packets that matches the higher-priority rule ("YES" branch of step 524), security management system 10 may remove the lower-priority rule (528). If security management system 10 determines that the first set of packets that matches the lower-priority rule is not a subset of the second set of packets that matches the higher-priority rule ("NO" branch of step 524), security management system 10 may preserve the set of ordered rules (526) and/or evaluates whether the the first set of packets that matches the higher-priority rule is a subset of the second set of packets that matches the lower-priority rule (530).

In another instance, security management system 10 may determine whether a first set of packets that matches a higher-priority rule is a subset of a second set of packets that matches a lower-priority rule (530). If security management system 10 determines that the first set of packets that matches the higher-priority rule is not a subset of the second set of packets that matches the lower-priority rule ("NO" branch of step 530), security management system 10 security management system 10 preserves the set of ordered rules (526). If security management system 10 determines that the first set of packets that matches the higher-priority rule is a subset of the second set of packets that matches the lower-priority rule ("YES" branch of step 530), security management system 10 determines whether the action of the higher-priority rule and the action of the lower-priority rule is the same (532). In response to determining that the actions are the same ("YES" branch of step 532), security management system 10 removes the higher-priority rule (534). Alternatively, if security management system 10 determines that the actions are different ("NO" branch of step 532), security management system 10 preserves the set of ordered rules (526).

Figure 5D:
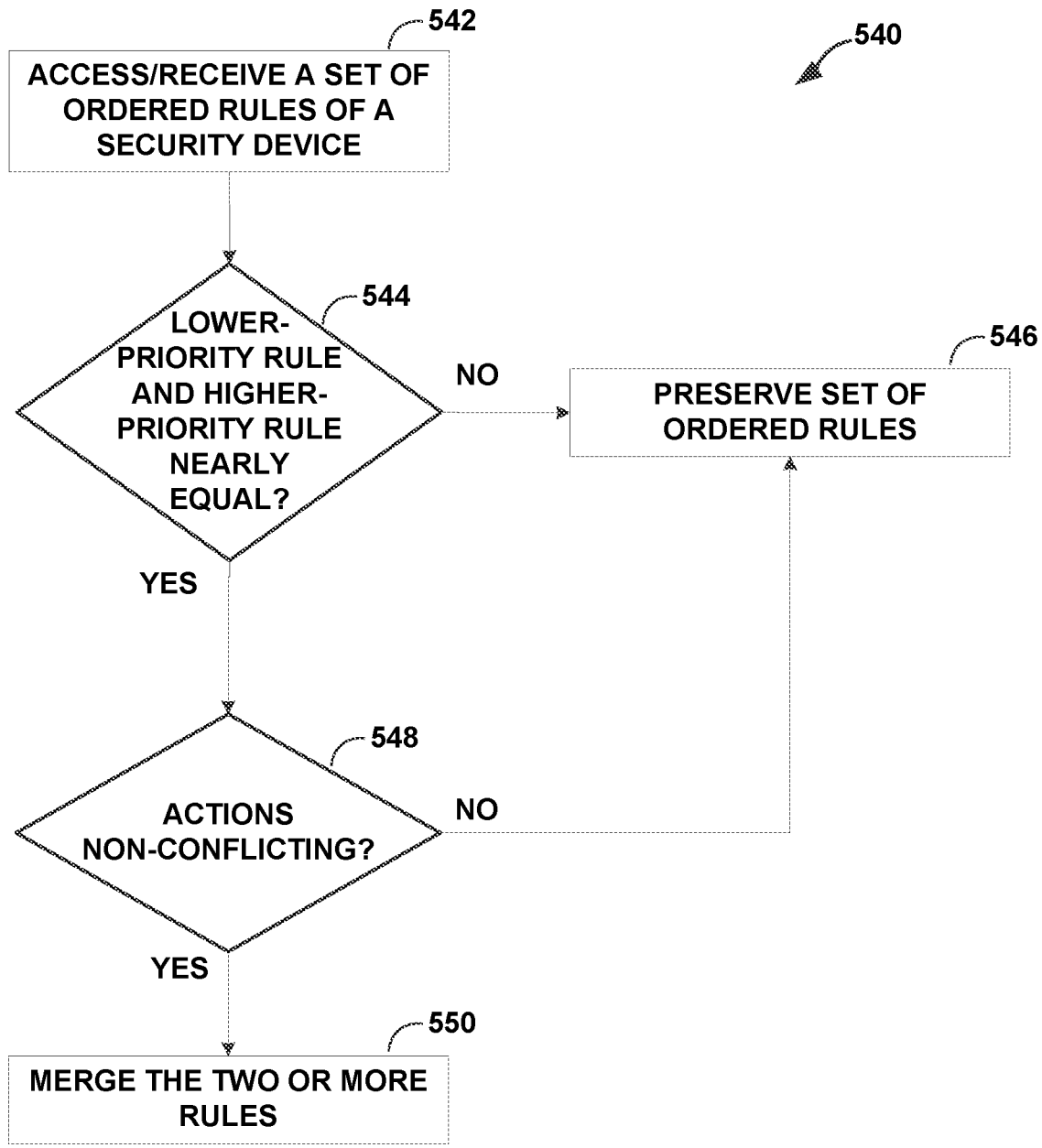

FIG. 5D is a flowchart showing an example of optimizing the transformed rule set using join/merge policies in greater detail. In the example of FIG. 5D, security management system 10 may perform operation 540 to remove correlation anomalies. In the example of operation 540, security management system 10 may access or receive a set of ordered rules of a security device (542). For example, security management system 10 may use SNMP or NETCONF to receive a set of ordered rules from a security device or to access the set of ordered rules within the security device.

Security management system 10 may determine whether a higher-priority rule and a lower-priority rule (e.g., a converted lower-priority rule) are nearly equal (544). For example, security management system 10 may determine whether all but one match parameter are equal in the higher-priority rule and the lower-priority rule. If security management system 10 determines that the the higher-priority rule and the lower-priority rule are not nearly equal ("NO" branch of step 544), security management system 10 preserves the set or ordered rules (546).

In response to determining that the higher-priority rule and the lower-priority rule are nearly equal ("YES" branch of step 544), security management system 10 may determine whether actions of the nearly equal rules are non-conflicting actions (548). For example, an administrator may define conflicting actions (e.g., accept and drop) and non-conflicting actions (accept and count). If security management system 10 determines that the actions are non-conflicting ("YES" branch of step 548), security management system 10 merges the rules that are nearly equal (550). Alternatively, if security management system 10 determines that actions are conflicting ("NO" branch of step 548), security management system 10 preserves the set of ordered rules (546).

Figure 6:
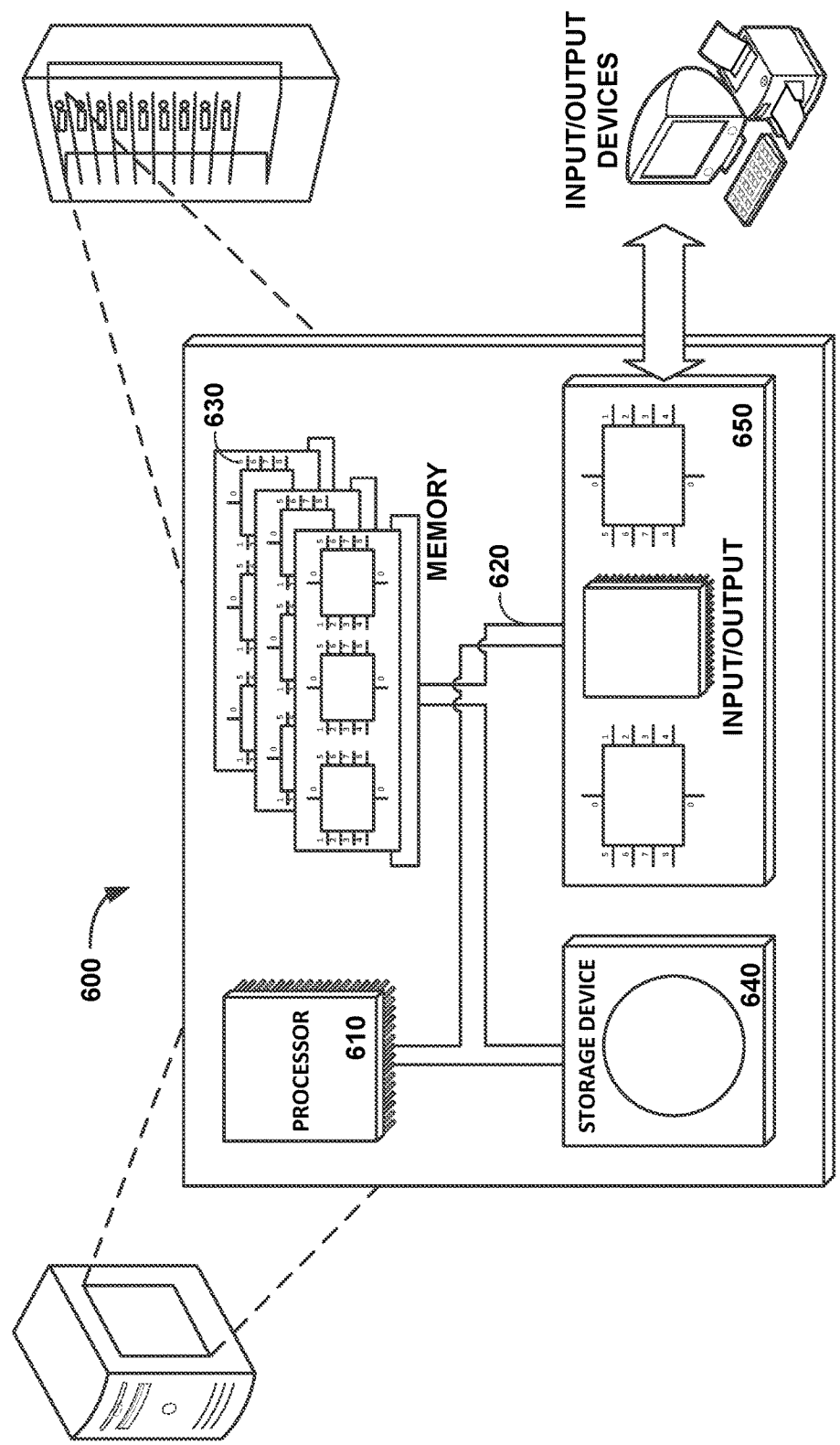
FIG. 6 shows a detailed example of a computing device that may be configured to implement one or more aspects of the techniques described herein.

FIG. 6 illustrates a detailed example of a computing device that may be configured to implement some examples in accordance with the current disclosure. For example, device 600 may be a server, a workstation, a computing center, a cluster of servers or other examples of a computing environment, centrally located or distributed, capable of executing the techniques described herein. Any or all of the devices may, for example, implement portions of the techniques described herein for security management system 10 of FIGS. 1 and 3. In this example, a computer 600 includes a hardware-based processor 610 that may be incorporated into security management system 10 to execute program instructions or software, causing the computer to perform various methods or tasks, such as performing the techniques described herein.

Processor 610 may be a general purpose processor, a digital signal processor (DSP), a core processor within an Application Specific Integrated Circuit (ASIC) and the like. Processor 610 is coupled via bus 620 to a memory 630, which is used to store information such as program instructions and other data while the computer is in operation. A storage device 640, such as a hard disk drive, nonvolatile memory, or other non-transient storage device stores information such as program instructions, data files of the multidimensional data and the reduced data set, and other information. As another example, computer 650 may provide an operating environment for execution of one or more virtual machines that, in turn, provide an execution environment for software for implementing the techniques described herein.

The computer also includes various input-output elements 650, including parallel or serial ports, USB, Firewire or IEEE 1394, Ethernet, and other such ports to connect the computer to external device such as a keyboard, touchscreen, mouse, pointer or the like. Other input-output elements include wireless communication interfaces such as Bluetooth, Wi-Fi, and cellular data networks.

The computer itself may be a traditional personal computer, a rack-mount or business computer or server, or any other type of computerized system. The computer in a further example may include fewer than all elements listed above, such as a thin client or mobile device having only some of the shown elements. In another example, the computer is distributed among multiple computer systems, such as a distributed server that has many computers working together to provide various functions.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium or device may store such instructions for execution by a processor. Any combination of one or more computer-readable medium(s) may be utilized.

A computer-readable storage medium (device) may form part of a computer program product, which may include packaging materials. A computer-readable storage medium (device) may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

Various examples of the techniques have been described. These and other examples are within the scope of the following claims.

What is claimed is:

1. A method comprising:
   determining, by a security management system, that one or more packets match a lower-priority rule and a higher-priority rule of a set of ordered rules of a network security device;
   in response to determining that the one or more packets match the lower-priority rule and the higher-priority rule, generating, by the security management system, a transformed set of ordered rules by converting the lower-priority rule to a mutually exclusive rule such that the one or more packets that originally match the lower-priority rule and the higher-priority rule do not match the converted lower-priority rule; and
   in response to converting the lower-priority rule to the mutually exclusive rule, optimizing, by the security management system, the transformed set of ordered rules for application by the network security device to subsequent packets.

2. The method of claim 1, wherein optimizing the transformed set of ordered rules comprises:
   removing the converted lower-priority rule if the converted lower-priority rule will never be matched.

3. The method of claim 1, wherein optimizing the transformed set of ordered rules comprises:
   determining, by the security management system, whether a first set of packets that matches the converted lower-priority rule is a subset of a second set of packets that matches the higher-priority rule; and
   in response to determining that the first set of packets that matches the converted lower-priority rule is the subset of the second set of packets that matches the higher-priority rule, removing, by the security management system, the converted lower-priority rule from the set of ordered rules.

4. The method of claim 1, wherein optimizing the transformed set of ordered rules comprises:
   determining, by the security management system, whether a second set of packets that matches the higher-priority rule is a subset of the first set of packets that matches the converted lower-priority rule;
   in response to determining that the second set of packets that matches the higher-priority rule is the subset of the first set of packets that matches the converted lower-priority rule, determining, by the security management system, whether an action of the higher-priority rule and an action of the converted lower-priority rule is the same; and
   in response to determining that the action of the higher-priority rule is the same as the action of the converted lower-priority rule, removing, by the security management system, the higher-priority rule from the set of ordered rules.

5. The method of claim 1, wherein optimizing the transformed set of ordered rules comprises:
   determining, by the security management system, whether a second set of packets that matches the higher-priority rule is a subset of the first set of packets that matches the converted lower-priority rule;
   in response to determining that the second set of packets that matches the higher-priority rule is the subset of the first set of packets that matches the converted lower-priority rule, determining, by the security management system, whether an action of the higher-priority rule and an action of the converted lower-priority rule is the same; and in response to determining that the action of the higher-priority rule and the action of the converted lower-priority rule is not the same, preserving the set of ordered rules.

6. The method of claim 1, wherein optimizing the transformed set of ordered rules comprises:
determining, by the security management system, whether the higher-priority rule and the converted lower-priority rule are nearly equal;
in response to determining that the higher-priority rule and the lower-priority rule are nearly equal, determining, by the security management system, whether an action of the higher-priority rule is non-conflicting with an action of the converted lower-priority rule; and
in response to determining that the actions are non-conflicting actions, merging the higher-priority rule and the lower-priority rule.

7. The method of claim 1, wherein optimizing the transformed set of ordered rules comprises:
determining, by the security management system, whether the higher-priority rule and the converted lower-priority rule are nearly equal;
in response to determining that the higher-priority rule and the converted lower-priority rule are nearly equal, determining, by the security management system, whether an action of the higher-priority is non-conflicting with an action of the converted lower-priority rule; and
in response to determining that the actions are conflicting actions, preserving the set of ordered rules.

8. A security management system comprising:
one or more processors, wherein the one or more processors are configured to:
determine that one or more packets match a lower-priority rule and a higher-priority rule of a set of ordered rules of a network security device;
in response to determining that the one or more packets match the lower-priority rule and the higher-priority rule, generate a transformed set of ordered rules by converting the lower-priority rule to a mutually exclusive rule such that the one or more packets that originally match the lower-priority rule and the higher-priority rule do not match the converted lower-priority rule; and
in response to converting the lower-priority rule to the mutually exclusive rule, optimize the transformed set of ordered rules for application by the network security device to subsequent packets.

9. The security management system of claim 8, wherein to optimize the transformed set of ordered rules, the one or more processors are further configured to:
remove the converted lower-priority rule if the converted lower-priority rule will never be matched.

10. The security management system of claim 8, wherein to optimize the transformed set of ordered rules, the one or more processors are further configured to:
determine whether a first set of packets that matches the converted lower-priority rule is a subset of a second set of packets that matches the higher-priority rule; and
in response to determining that the first set of packets that matches the converted lower-priority rule is the subset of the second set of packets that matches the higher-priority rule, remove the converted lower-priority rule from the set of ordered rules.

11. The security management system of claim 8, wherein to optimize the transformed set of ordered rules, the one or more processors are further configured to:
determine whether a second set of packets that matches the higher-priority rule is a subset of the first set of packets that matches the converted lower-priority rule;
in response to determining that the second set of packets that matches the higher-priority rule is the subset of the first set of packets that matches the converted lower-priority rule, determine whether an action of the higher-priority rule and an action of the converted lower-priority rule is the same; and
in response to determining that the action of the higher-priority rule is the same as the action of the converted lower-priority rule, remove the higher-priority rule from the set of ordered rules.

12. The security management system of claim 8, wherein to optimize the transformed set of ordered rules, the one or more processors are further configured to:
determine whether a second set of packets that matches the higher-priority rule is a subset of the first set of packets that matches the converted lower-priority rule;
in response to determining that the second set of packets that matches the higher-priority rule is the subset of the first set of packets that matches the converted lower-priority rule, determine whether an action of the higher-priority rule and an action of the converted lower-priority rule is the same; and
in response to determining that the action of the higher-priority rule and the action of the converted lower-priority rule is not the same, preserve the set of ordered rules.

13. The security management system of claim 8, wherein to optimize the transformed set of ordered rules, the one or more processors are further configured to:
determine whether the higher-priority rule and the converted-lower priority rule are nearly equal;
in response to determining that the higher-priority rule and the converted lower-priority rule are nearly equal, determine whether an action of a higher-priority rule is non-conflicting with an action of the converted lower-priority rule; and
in response to determining that the actions are non-conflicting actions, merge the higher-priority rule and the lower-priority rule.

14. The security management system of claim 8, wherein to optimize the transformed set of ordered rules, the one or more processors are further configured to:
determine whether the higher-priority rule and the converted lower-priority rule are nearly equal;
in response to determining that the higher-priority rule and the converted lower-priority rule are nearly equal, determine whether an action of the higher-priority rule is non-conflicting with an action of the converted lower-priority rule; and
in response to determining that the actions are conflicting actions, preserve the set of ordered rules.

15. A non-transitory computer-readable storage medium having stored thereon instructions that, when executed, cause one or more processors to:
determine that one or more packets matches a lower-priority rule and a higher-priority rule of a set of ordered rules of a network security device;
in response to determining that the one or more packets match the lower-priority rule and the higher-priority rule, generate a transformed set of ordered rules by converting the lower-priority rule to a mutually exclusive rule such that the one or more packets that originally match the lower-priority rule and the higher-priority rule do not match the converted lower-priority rule; and in response to converting the low-priority rule to the mutually exclusive rule, optimize the transformed set of ordered rules for application by the network security device to subsequent packets.

16. The non-transitory computer-readable storage medium of claim 15, wherein to optimize the transformed set of ordered rules, the instructions further cause the one or more processors to:

remove the converted lower-priority rule if the converted-lower priority rule will never be matched.

17. The non-transitory computer-readable storage medium of claim 15, wherein to optimize the transformed set of ordered rules, the instructions further cause the one or more processors to:

determine whether a first set of packets that matches the converted lower-priority rule is a subset of a second set of packets that matches the higher-priority rule; and in response to determining that the first set of packets that matches the converted lower-priority rule is the subset of the second set of packets that matches the higher-priority rule, remove the converted lower-priority rule from the set of ordered rules.

18. The non-transitory computer-readable storage medium of claim 15, wherein to optimize the transformed set of ordered rules, the instructions further cause the one or more processors to:

determine whether a second set of packets that matches the higher-priority rule is a subset of the first set of packets that matches the converted lower-priority rule;

in response to determining that the second set of packets that matches the higher-priority rule is the subset of the first set of packets that matches the converted lower-priority rule, determine whether an action of the higher-priority rule and an action of the converted lower-priority rule is the same; and in response to determining that the action of the higher-priority rule is the same as the action of the converted lower-priority rule, remove the higher-priority rule from the set of ordered rules.

19. The non-transitory computer-readable storage medium of claim 15, wherein to optimize the transformed set of ordered rules, the instructions further cause the one or more processors to:

determine whether a second set of packets that matches the higher-priority rule is a subset of the first set of packets that matches the converted lower-priority rule;

in response to determining that the second set of packets that matches the higher-priority rule is the subset of the first set of packets that matches the converted lower-priority rule, determine whether an action of the higher-priority rule and an action of the converted lower-priority rule is the same; and in response to determining that the action of the higher-priority rule and the action of the converted lower-priority rule is not the same, preserve the set of ordered rules.

20. The non-transitory computer-readable storage medium of claim 15, wherein to optimize the transformed set of ordered rules, the instructions further cause the one or more processors to:

determine whether the higher-priority rule and the converted-lower priority rule are nearly equal;

in response to determining that the higher-priority rule and the converted-lower priority rule are nearly equal, determine whether an action of the higher-priority rule is non-conflicting with an action of the converted-lower priority rule; and in response to determining that the actions are non-conflicting actions, merge the higher-priority rule and the converted-lower priority rule.

* * * * *